(12) United States Patent
Suganuma (10) Patent No.: US 9,073,390 B2
(45) Date of Patent: Jul. 7, 2015

(54) HEAVY DUTY TIRE

(75) Inventor: Akira Suganuma, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 108 days.

(21) Appl. No.: 13/378,248

(22) PCT Filed: Jun. 14, 2010

(86) PCT No.: PCT/JP2010/060025
§ 371 (c)(1),
(2), (4) Date: Mar. 19, 2012

(87) PCT Pub. No.: WO2010/147076
PCT Pub. Date: Dec. 23, 2010

(65) Prior Publication Data
US 2012/0168048 A1    Jul. 5, 2012

(30) Foreign Application Priority Data

Jun. 15, 2009    (JP) .................. 2009-142472

(51) Int. Cl.
*B60C 11/00*    (2006.01)
*B60C 11/03*    (2006.01)
*B60C 11/04*    (2006.01)
*B60C 11/117*    (2006.01)

(52) U.S. Cl.
CPC ........... *B60C 11/04* (2013.01); *B60C 2011/039* (2013.04); *B60C 2011/0386* (2013.04);
(Continued)

(58) Field of Classification Search
CPC ................. B60C 2011/039; B60C 2011/0397; B60C 2011/0358; B60C 2011/0372; B60C 2011/0374; B60C 2011/0351; B60C 2011/0362; B60C 2011/1236; B60C 2011/1245; B60C 11/0306

USPC ........... 152/209.27, 901, 900, DIG. 3, 209.18
See application file for complete search history.

(56) References Cited

U.S. PATENT DOCUMENTS 2,670,777 A * 3/1954 Wallace ..................... 152/209.4
2,708,957 A * 5/1955 Constantakis et al. ... 152/209.25
(Continued)

FOREIGN PATENT DOCUMENTS

| JP | 2-88311 A | 3/1990 |
| JP | 08-099505 A | 4/1996 |

(Continued)

OTHER PUBLICATIONS

Machine Translation: JP2000-247112; Ishiyama, Makoto; No Date.*
(Continued)

*Primary Examiner* — Steven D Maki
*Assistant Examiner* — Kendra Ly
(74) *Attorney, Agent, or Firm* — Sughrue Mion, PLLC (57) ABSTRACT

A heavy duty tire comprising: a shoulder rib (A1) (shoulder rib (A5)) which is provided to a tread shoulder unit; a second rib (A2) (second rib (A4)) which is adjacent to the shoulder rib (A1) with a circumferential groove (110) (circumferential groove (116)) interposed therebetween and is provided further toward the tire equator side than the shoulder rib (A1); and an uneven wear absorbing rib (B1) (uneven wear absorbing rib (B2)) provided within the circumferential groove (110) and located further toward the inside in the tire radial direction than the tread surfaces of the shoulder rib (A1) and of the second rib (A2). Circumferential narrow grooves (10, 12) having a smaller width than the circumferential grooves (110, 116) are formed in the second ribs (A2, A4). Each circumferential narrow groove (10, 12) is formed in such a manner that, when the tire is mounted on the vehicle, the circumferential groove (10, 12) is located on the outer side of the tire with reference to the center of the second rib (A2, A4) in the tread width direction.

6 Claims, 4 Drawing Sheets

(52) U.S. Cl.
CPC . *B60C2011/1245* (2013.04); *B60C 2011/0374* (2013.04); *B60C 2011/0397* (2013.04); *B60C 2200/06* (2013.04); *B60C 11/047* (2013.04); *B60C 2011/0383* (2013.04); *B60C 2011/0381* (2013.04); *B60C 2011/133* (2013.04); *B60C 11/042* (2013.04); *B60C 2011/036* (2013.04); *B60C 2011/0362* (2013.04); *B60C 2011/0348* (2013.04); *B60C 2011/0351* (2013.04)

(56) References Cited

U.S. PATENT DOCUMENTS

| | | | | |
|---|---|---|---|---|
| 5,131,444 | A | * | 7/1992 | Kukimoto et al. ....... 152/209.19 |
| 5,665,184 | A | | 9/1997 | Fukumoto |
| 6,142,200 | A | * | 11/2000 | Feider et al. ............. 152/209.14 |
| 6,340,041 | B1 | | 1/2002 | Sugihara et al. |

FOREIGN PATENT DOCUMENTS

| | | | | |
|---|---|---|---|---|
| JP | 2000-158916 | A | | 6/2000 |
| JP | 2000247112 | A | * | 9/2000 ............ B60C 11/12 |
| JP | 2000-272307 | A | | 10/2000 |
| JP | 2001055013 | A | * | 2/2001 ............ B60C 11/04 |
| JP | 2001063316 | A | * | 3/2001 |
| JP | 2004-155382 | A | | 6/2004 |
| JP | 2006-240591 | A | | 9/2006 |
| JP | 2007168597 | A | | 7/2007 |

OTHER PUBLICATIONS

Machine Translation: JP 2001-063316A; Tanaka, Akira; No date.*
Machine Translation: JP2001-055013; Kanamaru, Shinya; (no date).*
International Search Report cited in PCT/JP2010/060025, dated Aug. 17, 2010.
Japanese Official Action Letter, Dated Feb. 4, 2014, issued in counterpart Japanese Patent Application No. 2011-519768.
Japanese Literature Submission, dated Dec. 17, 2013, issued in counterpart Japanese Patent Application No. 2011-519768.
Communication dated Mar. 31, 2015 from the Japanese Patent Office in counterpart application No. 2011-519768 English Translation.

* cited by examiner

HEAVY DUTY TIRE

CROSS REFERENCE TO RELATED APPLICATIONS

This application is a National Stage of International Application No. PCT/JP2010/060025 filed Jun. 14, 2010, claiming priority based on Japanese Patent Application No. 2009-142472 filed Jun. 15, 2009, the contents of all of which are incorporated herein by reference in their entirety.

TECHNICAL FIELD

The present invention relates to a heavy duty tire provided with a shoulder rib that is arranged in a tread shoulder unit and extends in the tire circumferential direction, a center side rib that is adjacent to the shoulder rib through a circumferential groove, is arranged nearer to a tire equator line than the shoulder rib, and extends in the tire circumferential direction, and an uneven wear absorbing rib that is arranged inside the circumferential groove, extends in the tire circumferential direction, and is located inwardly in a tire radial direction from the tread of the shoulder rib and the center side rib.

BACKGROUND ART

Conventionally, in heavy duty tires which are mounted on vehicles like a truck or a bus mostly operating on straight routes, in order to prevent the uneven wear of a tread shoulder unit, specifically, a shoulder rib and the like which configure the rib of the tread shoulder unit, there is widely used a method to arrange an uneven wear absorbing rib (BCR) provided with a step in the circumferential groove so as to retain a lower position than the tread of the rib (for example, Patent Document 1).

According to such an uneven wear absorbing rib, in the region provided with the step, it is possible to generate the shear force in the reverse direction with respect to the forward direction of the vehicle. For this, the shear force of the forward direction with respect to an edge unit of the shoulder rib is reduced. Accordingly, the uneven wear of the shoulder rib can be prevented.

PRIOR ART DOCUMENT

Patent Document

PATENT DOCUMENT 1: Japanese Unexamined Patent Application Publication No. H02-88311 (Pages 4-5, FIG. 3)

SUMMARY OF THE INVENTION

However, the above-mentioned conventional heavy duty tires are designed assuming that the vehicle is mostly operating on straight routes. Therefore, there is a room for improvement in the wet performance that includes performance at the time of turning, in particular, a water discharge performance, a steering stability performance, etc., at the time of turning.

In order to improve the wet performance at the time of turning, it may be possible to conceive the formation of a large number of circumferential grooves in an outer tread shoulder unit such as a shoulder rib, where the ground contact length increases at the time of turning, when it is mounted on the vehicle. However, the formation of a large number of circumferential grooves in the tread shoulder unit increases the presence of edge units. Because of this, the ground pressure is concentrated at the edge unit, resulting in a problem that the tread shoulder unit is easily worn unevenly.

Therefore, it is an object of the present invention to provide a heavy duty tire in which wet performance at the time of turning is further improved while uneven wear of the tread shoulder unit is inhibited.

Means for Solving the Problem

To solve the above problem, the present invention has following features. A first feature of the present invention is summarized as a heavy duty tire (heavy duty tire 1), comprising: a shoulder rib (shoulder rib A1, shoulder rib A5) that is arranged in a tread shoulder unit and extends in a tire circumferential direction (tire circumferential direction R); a center side rib (second rib A2, second rib A4) that is adjacent to the shoulder rib through a circumferential groove (circumferential groove 110, for example), is arranged nearer to a tire equator line (tire equator line CL) than the shoulder rib, and extends in the tire circumferential direction; and an uneven wear absorbing rib (uneven wear absorbing rib B1) that is arranged in the circumferential groove, extends in the tire circumferential direction, and is positioned inwardly in a tire radial direction from a tread of the shoulder rib and the center side rib, wherein in the center side rib, a circumferential narrow groove (circumferential narrow groove 10, for example) is formed that has a groove width smaller than the circumferential groove and extends in the tire circumferential direction, and the circumferential narrow groove is formed outwardly from a center in the tread width direction (tread width direction W) of the center side rib, when the tire is mounted on a vehicle.

According to such a heavy duty tire, a circumferential narrow groove is formed in the center side rib where the ground contact length increases at the time of turning. This increases the presence of the edge units at the time of turning, and at the same time, the edge pressure can be inhibited from being concentrated in the tread shoulder unit such as a shoulder rib. Also, since the circumferential narrow groove extends in the tire circumferential direction, the water discharge performance can be improved.

Accordingly, it is possible to provide a heavy duty tire in which the wet performance at the time of turning, which includes a water discharge performance and a steering stability performance, is further improved while inhibiting uneven wear of the tread shoulder unit.

A second feature of the present invention according to the first feature of the present invention is summarized as that an intersectional narrow groove (intersectional narrow groove 30) intersecting the circumferential narrow groove is formed in the center side rib.

A third feature of the present invention according to the second feature of the present invention is summarized as that the intersectional narrow groove comprises: a transverse groove (transverse groove 32) extending along the tread width direction (tread width direction W); and a longitudinal groove (longitudinal groove 34) extending along the tire circumferential direction.

A fourth feature of the present invention according to the second or the third feature of the present invention is summarized as that in the center side rib, a narrow groove (narrow groove 20) is formed that extends in the tread width direction and has a groove width smaller than the circumferential groove, and in planner view of a tread surface, compared to a center in the tread width direction of the center side rib, a total area of the circumferential narrow groove, the narrow groove, and the intersectional narrow groove provided on outward of the center side rib when a tire is mounted on a vehicle, is set to be 1.5 times or more a total area of the narrow groove and the intersectional narrow groove provided on inward of the center side rib when the tire is mounted on the vehicle.

A fifth feature of the present invention according to the third or the forth feature of the present invention is summarized as that the intersectional narrow groove is formed in L shape.

A sixth feature of the present invention according to any one of the second to the fifth features of the present invention is summarized as that either end of the intersectional narrow groove communicates to the circumferential groove.

A seventh feature of the present invention according to any one of the first to the sixth features of the present invention is summarized as that in the center side rib, a plurality of intersectional transverse grooves (intersectional transverse grooves 142, for example) communicating to the circumferential groove are formed, and the plurality of intersectional transverse grooves are formed at predetermined interval (interval P2) in a tire circumferential direction.

According to the characteristics of the present invention, it is possible to provide a heavy duty tire in which wet performance at the time of turning is further improved while inhibiting uneven wear of the tread shoulder unit.

MODES FOR CARRYING OUT THE INVENTION

Next, an embodiment of a heavy duty tire according to the present invention is explained with reference to drawings. In the following description of the drawings, the same or similar reference numerals are used to designate the same or similar parts. However, it should be noted that the drawings are schematic and ratios of respective dimensions and the like are different from actual ones.

Therefore, detailed dimension and the like should be determined considering the following description. Of course, among the drawings, the dimensional relationship and the ratio are different.

In this embodiment, explanation about, (1) Entire Configuration of Heavy Duty Tire, (2) Detailed Shape of Circumferential Narrow Groove, (3) Detailed Shape of Intersectional Narrow Groove, (4) Detailed Shape of Intersectional Transverse Groove, (5) Modifications, (6) Comparative Evaluation, (7) Operation and Effect, and (8) Other Embodiments, is given.

(1) Entire Configuration of Heavy Duty Tire

Figure 1:
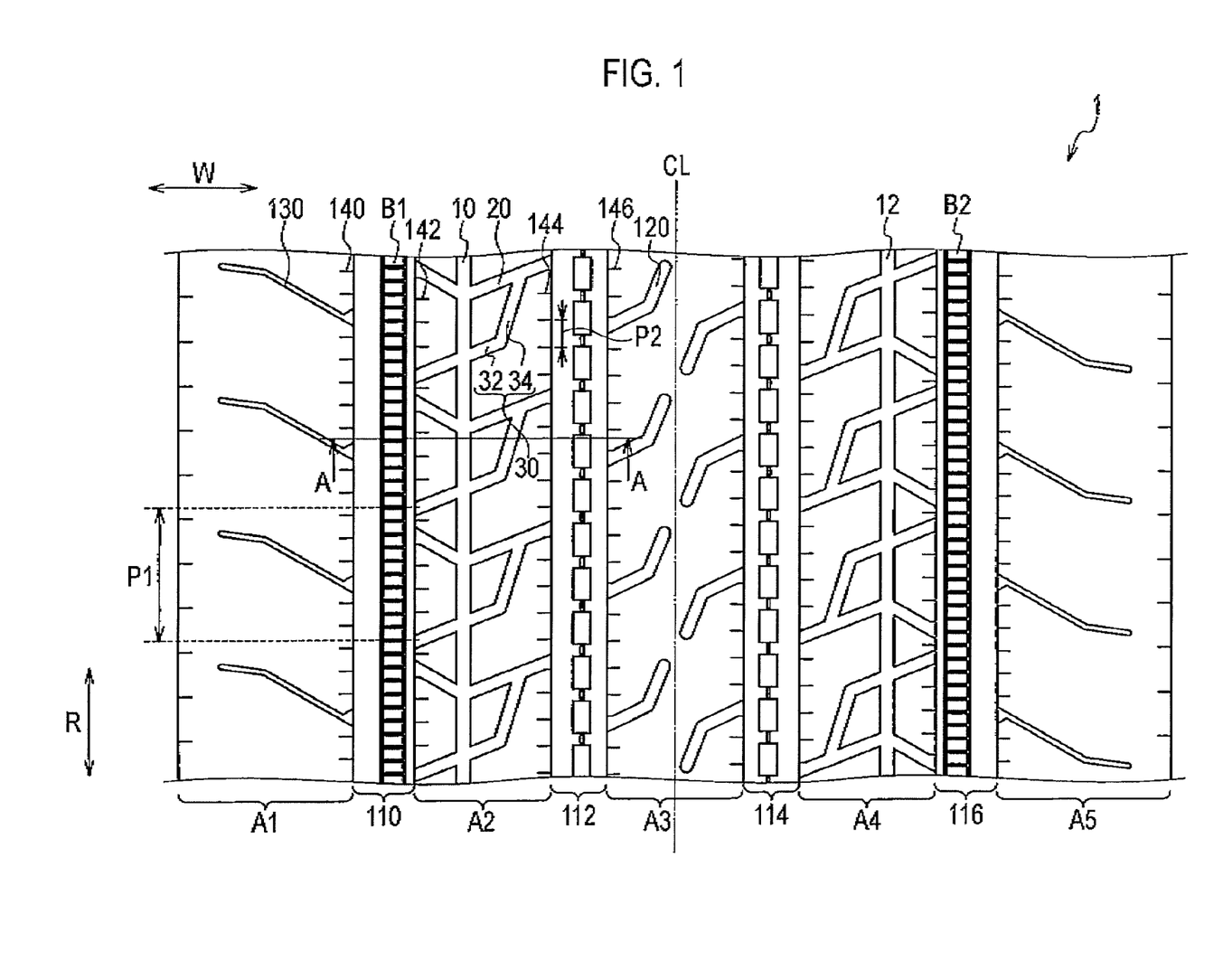
FIG. 1 is a development diagram of patterns arranged in a tread unit of a heavy duty tire according to an embodiment of the present invention.
Figure 2:
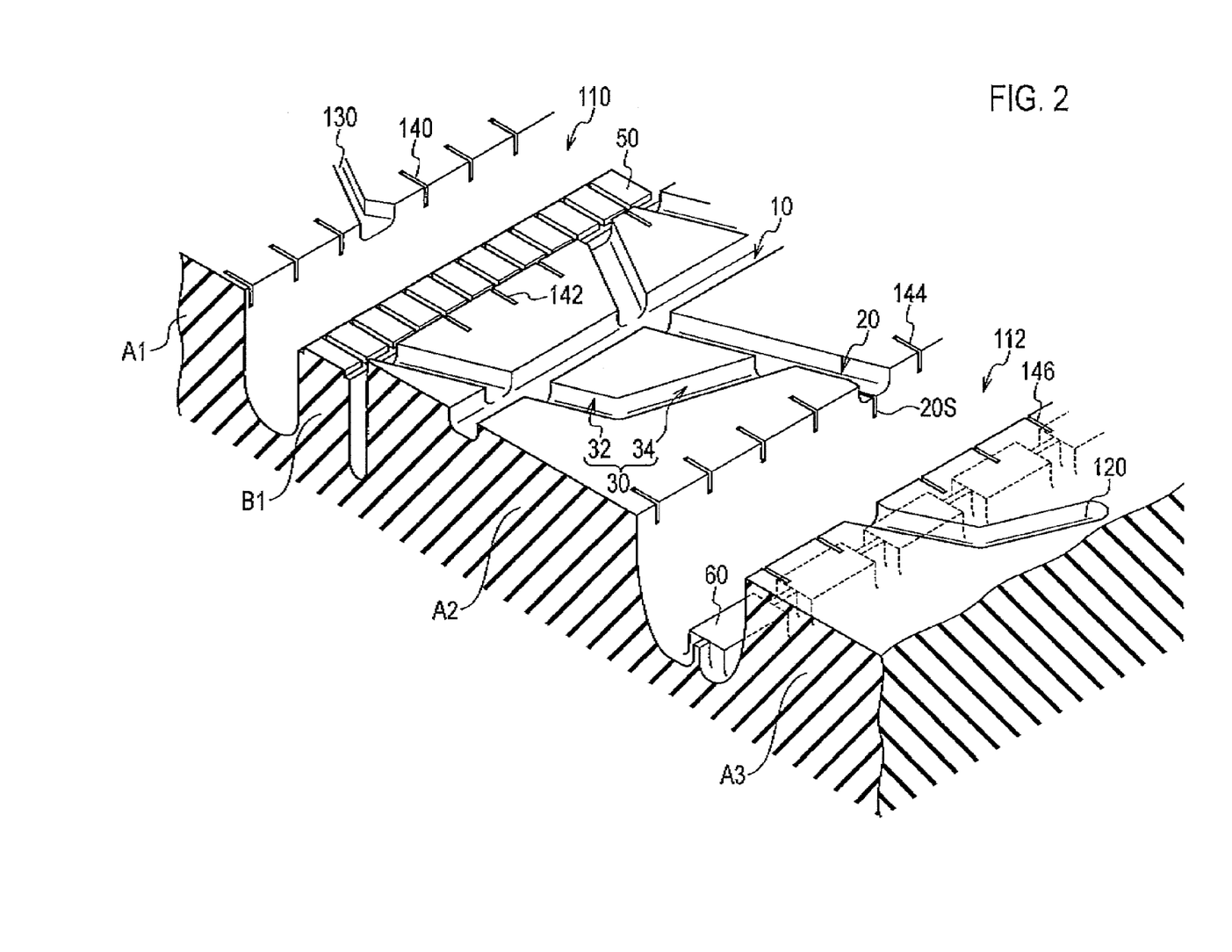
FIG. 2 is a partial cross-sectional perspective view of the tread unit of the heavy duty tire according to the embodiment of the present invention.
Figure 3:
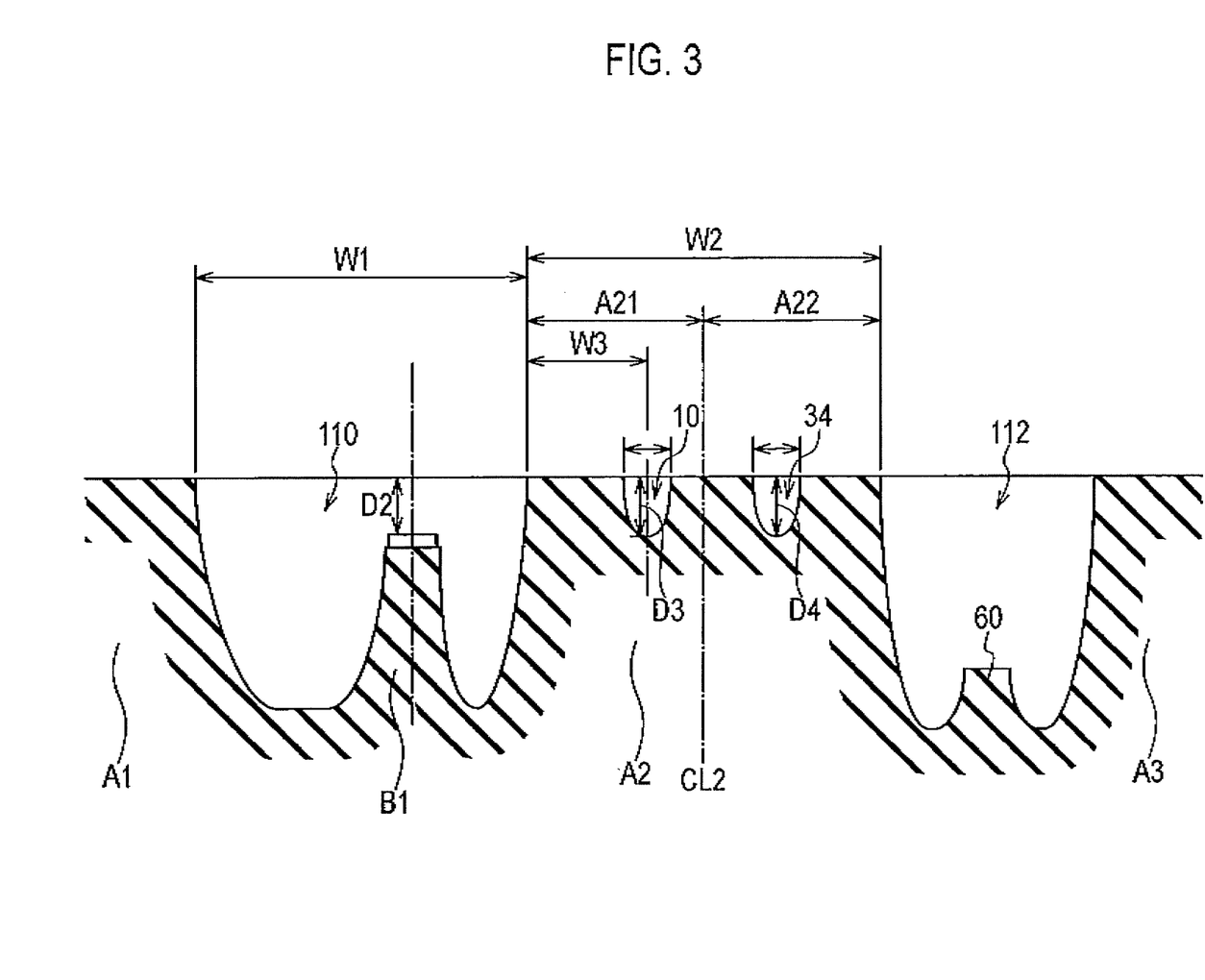
FIG. 3 is a cross-sectional view taken along A-A of FIG. 1.

FIG. 1 is a development diagram of a tread configuring a heavy duty tire 1 according to an embodiment of the present invention. FIG. 2 is a partial cross-sectional perspective view of a tread unit of the heavy duty tire 1 according to the embodiment of the present invention. FIG. 3 is a cross-sectional view taken along A-A of the tread unit of the heavy duty tire 1 according to the embodiment of the present invention. The heavy duty tire 1 is mounted on vehicles such as a truck and a bus that are mostly operating on straight routes. The heavy duty tire 1 includes a plurality of ribs extending along a tire circumferential direction R. Specifically, the heavy duty tire 1 includes a shoulder rib A1, a second rib A2, a center rib A3, a second rib A4, a shoulder rib A5, an uneven wear absorbing rib B1, and an uneven wear absorbing rib B2. Also, in the heavy duty tire 1, a circumferential groove 110, a circumferential groove 112, a circumferential groove 114, and a circumferential groove 116 which extend along the tire circumferential direction R are formed between a plurality of ribs.

The shoulder rib A1 and the shoulder rib A5 are arranged in a tread shoulder unit and extend in the tire circumferential direction R. A transverse groove 130 extending in a tread width direction W is formed in the shoulder rib A1 and the shoulder rib A5. Note that the tread shoulder unit is a region, on the surface of the heavy duty tire 1, occupying between a tread unit grounding the road surface and a side wall unit.

The second rib A2 and the second rib A4 configure a center side rib. Specifically, the second rib A2 is adjacent to the shoulder rib A1 through the circumferential groove 110, is arranged nearer to a tire equator line CL than the shoulder rib A1, and extends in the tire circumferential direction R. Note that the tire equator line CL is a line that passes through the center of the tread width direction W of the heavy duty tire 1. The second rib A4 is adjacent to the shoulder rib A5 through the circumferential groove 116, is arranged nearer to the tire equator line CL than the shoulder rib A5, and extends in the tire circumferential direction R. The center rib A3 is arranged on the tire equator line CL and extends in the tire circumferential direction R.

Note that, as mentioned above, the heavy duty tire 1 according to the embodiment of the present invention includes the four circumferential grooves and the five ribs that are sectioned by the four circumferential grooves. However, this is not always the case, and although not illustrated, it is possible to apply the configuration of the subject application by forming such that the heavy duty tire 1 includes three circumferential grooves and four ribs that are sectioned by three circumferential grooves.

The uneven wear absorbing rib B1 is arranged in the circumferential groove 110, extends in the tire circumferential direction R, and is located inwardly in the tire radial direction from the tread of the shoulder ribs A1 and A5, the second ribs A2 and A4, and the center rib A3. A distance D2 between the uneven wear absorbing rib B1 and the tread of the shoulder rib A1 and the second rib A2 is set to 1.0 mm to 15.0 mm. The uneven wear absorbing rib B1 is formed outwardly, when the tire is, mounted on the vehicle, from the center in the tread width direction W of the circumferential groove 110.

Note that the uneven wear absorbing rib B2 arranged in the circumferential groove 116 provides a characteristic similar to that of the uneven wear absorbing rib B1, hence, those details are omitted.

A transverse groove extending along the tread width direction W is formed in each rib. Specifically, a transverse groove 130 is formed in the shoulder rib A1 and the shoulder rib A5. A transverse groove 20 is formed in the second rib A2 and the second rib A4, A transverse groove 120 is formed in center rib A3. A length W2 of the tread width direction W of the second rib A2 and the second rib A4 is set to 65 to 90% or less than the length of the tread width direction W of the shoulder rib A1 and the shoulder rib A5. The transverse groove 20, the transverse groove 120, and the transverse groove 130 extended in the tread width direction W, and the groove widths thereof are smaller than the circumferential grooves and the depth of the tire radial direction is smaller than those of the circumferential grooves. Also, the transverse groove 120 formed in the center rib A3 is configured in such a way that it ends in a land unit.

A sipe 20S is arranged in the transverse groove 20 formed in the second rib A2 and the second rib A4, and a sipe 120S (not shown) is arranged in the transverse groove 120 formed in the center rib A3. The sipe 20S is formed in such a way that the depth of the tire radial direction is larger in comparison with those of other parts of the sipe 20S, in an opening portion where the circumferential grooves 112 and 114 and the transverse groove 20 communicate and in a center portion of the tread width direction W of each of the second rib A2 and the second rib A4.

The sipe 120S is formed in such a way that the depth of the tire radial direction is larger in comparison with those of other parts of the sipe 120S, in an opening portion where the circumferential grooves 112 and 114 and transverse groove 120 communicate and in a center portion of the tread width direction W of the center rib A3.

The depths of the tire radial direction D of the circumferential groove 110, the circumferential groove 112, the circumferential groove 114, and the circumferential groove 116 are formed to be 7 to 22 mm.

A stone-biting prevention rib 60 is formed in the circumferential groove 112 and the circumferential groove 114. The stone-biting prevention rib 60 is arranged respectively in the circumferential groove 112 and the circumferential groove 114, extends in the tire circumferential direction R, and is located inwardly in the tire radial direction from the tread of the shoulder ribs A1 and A5, the second ribs A2 and A4, and the center rib A3.

(2) Detailed Shape of Circumferential Narrow Groove

A circumferential narrow groove 10 that extends in the tire circumferential direction R and has a width smaller than the circumferential groove 110 is formed in second rib A2. Note that the circumferential narrow groove 12 which is formed in the second rib A4 has a characteristic similar to that of the circumferential narrow groove 10. Hence, the description about the details of the circumferential narrow groove is omitted.

As shown in FIG. 3, the second rib A2 is configured by: a second small rib A21 which is located outwardly, when the tire is mounted on the vehicle, from the center of CL2 in the tread width direction W of the second rib A2; and a second small rib A22 which is located inwardly therefrom, when the tire is mounted on the vehicle. With respect to the center of CL2 in the tread width direction W of the second rib A2, the circumferential narrow groove 10 is formed outwardly when the tire is mounted on the vehicle. Specifically, in the tread width direction W, a distance W3 from the end outwardly, when the tire is mounted on the vehicle, of the second rib A2, from the center of the circumferential narrow groove 10 is set to the length of ⅙ to ½ relative to the length W2 of the second rib A2. A depth D3 of the tire radial direction of the circumferential narrow groove 10 is set to 0.5 mm to 3.0 mm inwardly in the tire radial direction from the tread of the second rib A2. That is, the circumferential narrow groove 10 is formed in such a way that the depths of the tire radial direction are smaller than those of the circumferential grooves 110, 112, 114, and 116.

(3) Detailed Shape of Intersectional Narrow Groove

As shown in the FIG. 1 through FIG. 3, a plurality of intersectional narrow grooves 30, which cross the circumferential narrow groove 10, are formed in the second rib A2. The intersectional narrow groove 30 includes a transverse groove 32 and a longitudinal groove 34. Either end of the intersectional narrow groove 30 is communicated to the circumferential groove. In other words, a plurality of intersectional narrow grooves 30, which are communicated to the circumferential groove and cross the circumferential narrow groove 10, are formed in the second rib A2. A plurality of intersectional narrow grooves 30 are formed at predetermined intervals P1 in the tire circumferential direction R.

In planner view of a tread surface, a total area of the circumferential narrow groove 10, the transverse groove 20, and the intersectional narrow groove 30 in second small rib A21 is set to be 1.5 times or more the total area of the transverse groove 20 and the intersectional narrow groove 30 in the second small rib A22.

The transverse groove 32 extends in linear fashion along the tread width direction W. Note that "extending along the tread width direction W" indicates inclination in the range of 0 to less than 45 degrees with respect to the straight line along the tread width direction W. One end of the transverse groove 32 communicates to the circumferential groove 110 and the other end communicates to the longitudinal groove 34. The longitudinal groove 34 extends in linear fashion along the tire circumferential direction R. Note that "extending along the tire circumferential direction R" indicates inclination in the range of 0 to less than 45 degrees with respect to the straight line along the tire circumferential direction R. One end of the longitudinal groove 34 communicates to the transverse groove 20 and the other end communicates to the transverse groove 32. In the intersectional narrow groove 30, the end of the longitudinal groove 34 extending in linear fashion along the tire circumferential direction R and the end of the transverse groove 32 extending in linear fashion along the tread width direction W communicate, and thus, the intersectional narrow groove 30 is formed in L shape.

Specifically, a depth D4 of the tire radial direction of the intersectional narrow groove 30 is set to 0.5 mm to 3.0 mm inwardly in the tire radial direction from the tread of the second rib A2. That is, the intersectional narrow groove 30 is formed in such a way that the depth of the tire radial direction is smaller than those of the circumferential grooves 110, 112, 114, and 116.

Noted that as shown in the FIG. 1, the transverse groove 20 formed in the second rib A2 and the second rib A4 and the transverse groove 32 in the intersectional narrow groove 30 differ in the inclining direction with respect to the straight line along the tread width direction W outwardly in the tread width direction W from the circumferential narrow groove 10. Specifically, the transverse groove 20 and the transverse groove 32 are inclined in a similar direction with respect to the straight line along the tread width direction W, inwardly in the tread width direction W from the circumferential narrow groove 10. Here, in the transverse groove 20, the direction inclined with respect to the straight line along the tread width direction W changes inwardly and outwardly in the tread width direction W, as seen from the circumferential narrow groove 10 or start point. That is, outwardly in the tread width direction W from the circumferential narrow groove 10, the transverse groove 20 and the transverse groove 32 are formed in such a way as to be inclined in the opposite direction with respect to the straight line along the tread width direction W.

(4) Detailed Shape of Intersectional Transverse Groove

As shown in FIG. 1 and FIG. 2, a plurality of intersectional transverse grooves 142 and a plurality of intersectional transverse grooves 144 communicating to the circumferential groove 110 or the circumferential groove 112 are formed in the second rib A2 (second rib A4).

The plurality of intersectional transverse grooves 142 and the plurality of intersectional transverse grooves 144 are formed at predetermined intervals P2 in the tire circumferential direction R.

A plurality of intersectional transverse grooves 140 communicating to the circumferential groove 110 or the circumferential groove 116 are formed in the shoulder rib A2 and the shoulder rib A5. In the center rib A3, a plurality of intersectional transverse grooves 146 communicating to the circumferential groove 112 or the circumferential groove 114 are formed. Note that the intersectional transverse groove 146 formed in the center rib A3 is configured to end in the land unit.

(5) Modifications

The heavy duty tire 1 according to the above-mentioned embodiment can be changed as follows. Note that identical numerals are assigned to parts identical to those in the heavy duty tire 1 according to the above-mentioned embodiment and different parts are mainly explained.

(5. 1) First Modification

Figure 4:
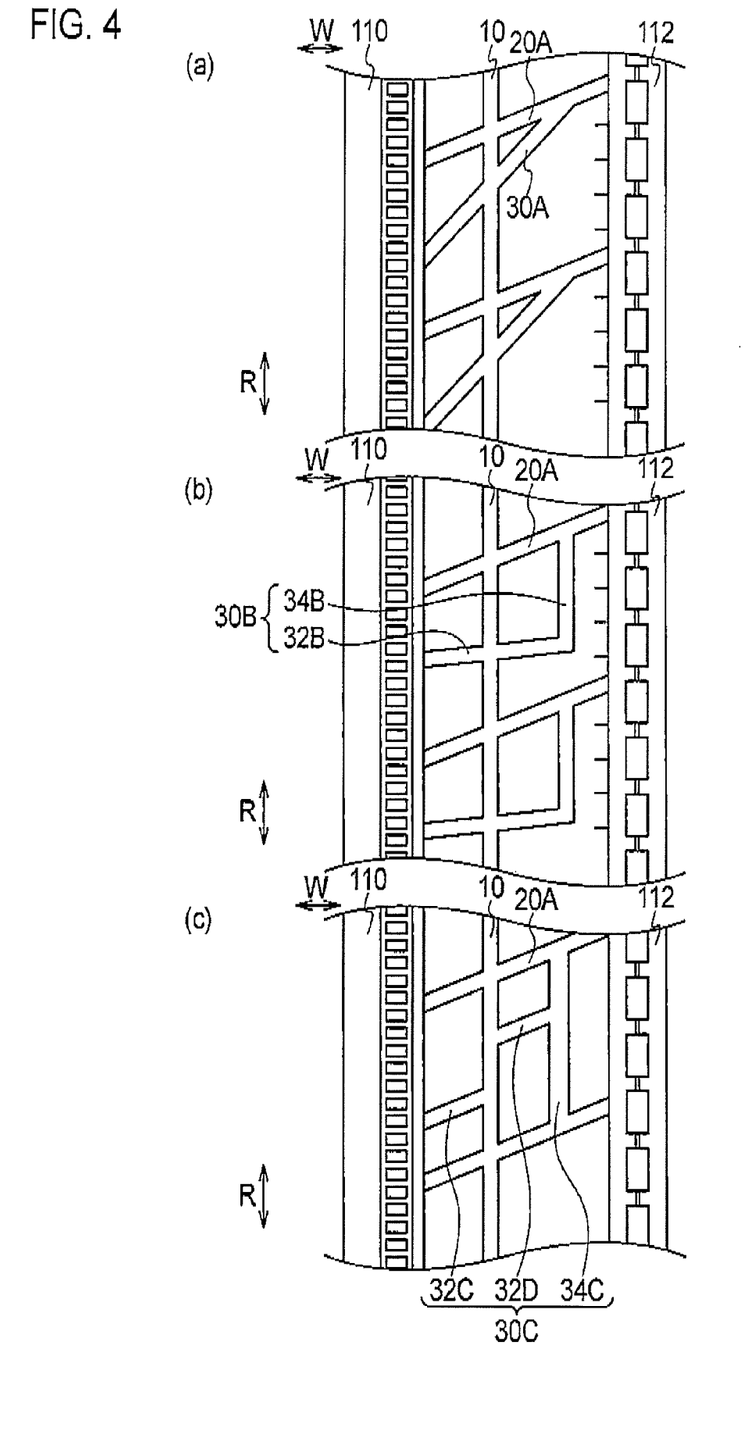
FIG. 4 is a partial development diagram of patterns arranged in a tread unit of the heavy duty tire according to a modification of the embodiment of the present invention.

The configuration of the heavy duty tire according to a first modification is explained with reference to the drawings. FIG. 4(a) is a partial development diagram of a pattern arranged in the tread unit of the heavy duty tire according to the first modification.

In the above-mentioned embodiment, the intersectional narrow groove 30 of the heavy duty tire 1 is formed in L shape including the transverse groove 32 extending along the tread width direction W and the longitudinal groove 34 extending along the tire circumferential direction R. As shown in FIG. 4(a), in the first modification, an intersectional narrow groove 30A is formed in linear fashion extending slantingly with respect to the tire circumferential direction R. One end of the intersectional narrow groove 30A communicates to the circumferential groove 110 and the other end communicates to a transverse groove 20A.

(5. 2) Second Modification

The configuration of the heavy duty tire according to a second modification is explained with reference to the drawings. FIG. 4(b) is a partial development diagram of a pattern arranged in the tread unit of the heavy duty tire according to the second modification.

As shown in FIG. 4(b), in the second modification, in the intersectional narrow groove 30B, the transverse groove 32B extending in linear fashion along the tread width direction W and the longitudinal groove 34B extending in linear fashion along the tire circumferential direction R communicate to each other in almost vertical fashion, and thus, the intersectional narrow groove 30B is formed in L shape having a right angle unit.

(5. 3) Third Modification

The configuration of the heavy duty tire according to a third modification is explained with reference to the drawings. FIG. 4(c) is a partial development diagram of a pattern arranged in the tread unit of the heavy duty tire according to the third modification.

As shown in FIG. 4(c), in third modification, the intersectional narrow groove 300 includes a transverse groove 320 extending in linear fashion along the tread width direction W, a transverse groove 32D, and a longitudinal groove 340 extending in linear fashion along the tire circumferential direction R.

(6) Comparative Evaluation

Subsequently, in order to further clarify the effect of the present invention, a comparative evaluation will be described in which heavy duty tires according to comparative examples and examples below were used. Specifically, (6. 1) Evaluation Method and (6. 2) Evaluation Result will be described. It is noted that the present invention is not limited to these examples in any way.

(6. 1) Evaluation Method

Using the heavy duty tires according to comparative examples 1 and 2 and an example, the evaluation on a turning performance on a wet road surface, that on a braking performance on a wet road surface, and that on an uneven wear resistance performance were performed. The data items regarding the heavy duty tire used in comparative evaluation are provided below.

Tire size: 315/70R22.5
Rim size: 9.00×22.5
Inner pressure parameters: 900 kPa
Load parameters: 4000 kg Each heavy duty tire has the same configuration except for the circumferential narrow groove. Further, the areas of the circumferential narrow groove, the intersectional narrow groove, and the transverse groove which are formed in the heavy duty tire are set to be equal.

The heavy duty tire according to the example has the configuration identical to that of the heavy duty tire 1 according to the embodiment. The heavy duty tire according to the comparative example 1 differs from the heavy duty tire according to the example in that the circumferential narrow groove is formed inwardly, when the tire is mounted on the vehicle, from the center in the tread width direction of the center side rib. The heavy duty tire according to the comparative example 2 differs from the heavy duty tire according to the example in that the circumferential narrow groove is formed in the shoulder rib.

(6. 1. 1) Evaluation of Turning Performance on Wet Road Surface

A vehicle on which every heavy duty tire was mounted was used and driven on a circular wet road surface with a predetermined radius, and an average time that took to drive around the course was calculated.

(6. 1. 2) Evaluation of Braking Performance on Wet Road Surface

Using the vehicle on which each heavy duty tire was mounted, the braking distance on the wet road surface was measured. Specifically, the braking distances from 90 km/h on the wet road surface were measured respectively for the vehicles in which each heavy duty tire was mounted.

(6. 1. 3) Evaluation of Uneven Wear Resistance Performance

After driving a predetermined distance, steps between the shoulder rib and the center side rib were measured, and the average value was calculated.

The evaluation results of the turning performance, the braking performance, and the uneven wear resistance performance are shown in comparative index when the evaluation result of the heavy duty tires according to the comparative example 1 is indexed at 100. The more superior the performance, the larger the value of the comparative index.

(6. 2) Evaluation Result

The evaluation results obtained by using the heavy duty tires according to the above-mentioned comparative examples and example are explained with reference to Table 1.

TABLE 1

|  | Comparative ex. 1 | Comparative ex. 2 | Example |
|---|---|---|---|
| Evaluation of turning performance on wet road surface | 100 | 110 | 105 |
| Evaluation of braking performance on wet road surface | 100 | 100 | 100 |
| Evaluation of uneven wear resistance performance | 100 | 90 | 100 |

As shown in Table 1, in comparison with the heavy duty tire according to the comparative example 1, the heavy duty tire according to the example showed equivalent uneven wear resistance performance and braking performance and also demonstrated an excellent turning performance. In comparison with the heavy duty tire according to the comparative example 1, the heavy duty tire according to the comparative example 2 showed an excellent turning performance but showed an inferior uneven wear resistance performance, (7) Operation and Effect As explained above, according to the heavy duty tire 1 of this embodiment, the circumferential narrow groove 10 (circumferential narrow groove 12) is formed in the second rib A2 (second rib A4) where the ground length increases at the time of turning. Because of this, together with the increase of the presence of edge units at the time of turning, the edge pressure can be inhibited from being concentrated in the tread shoulder unit such as a shoulder rib A1 (shoulder rib A5). Also, since the circumferential narrow groove 10 (circumferential narrow groove 12) extends in the tire circumferential direction R, the water discharge performance can be improved.

Accordingly, it is possible to provide a heavy duty tire in which the wet performance, which includes a water discharge performance and a steering stability performance, is further improved at the time of turning while inhibiting uneven wear of the tread shoulder unit.

According to the present embodiment, the intersectional narrow groove 30 crossing the circumferential narrow groove 10 (circumferential narrow groove 12) is formed in the second rib A2 (second rib A4). This increases the presence of edge elements at the time of turning. Therefore, the braking performance, etc., at the time of turning are improved further.

According to the present embodiment, the intersectional narrow groove 30 includes the transverse groove 32 extending along the tread width direction W, hence, the transverse groove 32 surely functions as an edge element at the time of driving on a straight route. Further, the intersectional narrow groove 30 includes the longitudinal groove 34 extending along the tire circumferential direction R, hence, the longitudinal groove 34 surely functions as an edge element at the time of turning. Therefore, according to the intersectional narrow groove 30, the braking performance, etc., at the time of driving on a straight route and at the time of turning are surely improved.

According to the present embodiment, in view of a tread surface, the second small rib A21, which is located outwardly, when the tire is mounted on the vehicle, of the second rib A2 (second rib A4), has a higher ground pressure than the second small rib A22, which is located inwardly when the tire is mounted on the vehicle. Further, the total area of the circumferential narrow groove 10, the transverse groove 20, and the intersectional narrow groove 30 in second small rib A21 is set to be 1.5 times or more the total area of the transverse groove 20 and the intersectional narrow groove 30 in the second small rib A22, which is located inwardly, when the tire is mounted on the vehicle, from the second rib A2 (second rib A4). This effectively increases the presence of edge units at the time of turning, and at the same time, serves to effectively improve the water discharge performance. Therefore, the wet performance at the time of turning, which includes the water discharge performance and the steering stability performance, can be improved further.

According to the present embodiment, the intersectional narrow groove 30 is formed in L shape. That is, because of the provision of the transverse groove 32 in almost linear fashion, the intersectional narrow groove 30 can further improve the braking performance, etc., at the time of driving on a straight route. Moreover, because of the provision of the longitudinal groove 34 in almost linear fashion, the intersectional narrow groove 30 can further improve the braking performance, etc., at the time of turning.

According to the present embodiment, either end of the intersectional narrow groove 30 communicates to the circumferential groove 110 or the circumferential groove 112. Because of this, the water flowing through the intersectional narrow groove 30 is discharged through the circumferential groove 110 or the circumferential groove 112. Therefore, the water discharge performance of the heavy duty tire 1 is improved furthermore.

According to the present embodiment, in the second rib A2 (second rib A4), a plurality of intersectional transverse grooves 142 (a plurality of intersectional transverse grooves 144) are formed at predetermined intervals P2 in the tire circumferential direction R, the braking performance, etc., at the time of driving on a straight route, is improved further.

According to the present embodiment, the circumferential narrow groove 10, the transverse grooves 20, 120, and 130, and the intersectional narrow groove 30 are formed in such a way that the depths of the tire radial direction are smaller than those of the circumferential grooves 110, 112, 114, and 116. This enables inhibition of lowering the rigidity of each rib, resulting in improvement of the wear resistance and improvement of the wet performance at the initial stage of wear.

According to the present embodiment, the sipe 20S is arranged in the transverse groove 20 formed in the second rib A2 and the second rib A4, and the sipe 120S is arranged in the transverse groove 120 formed in the center rib A3. This enables retaining the wet performance at the final stage of wear of the second rib A2, the second rib A4, and the center rib A3.

According to the present embodiment, the sipe 20S is formed in such a way that the depth of the tire radial direction is larger in comparison with those of other parts of the sipe 20S, in the opening portion where the circumferential grooves 112 and 114 and the transverse groove 20 communicate and in the center portion of the tread width direction W of each of the second rib A2 and the second rib A4. Further, the sipe 120S is formed in such a way that the depth of the tire radial direction is larger in comparison with those of other parts of the sipe 120S, in the opening portion where the circumferential grooves 112 and 114 and the transverse groove 120 communicate and in the center portion of the tread width direction W of the center rib A3. Because of this, the depths of the tire radial direction of the sipe 20S and the sipe 120S along the tread width direction W are differed, and thus, it is possible to inhibit lowering the rigidity of the second rib A2, the second rib A4, and the center rib A3. As a result, it is possible to improve the braking performance and the wear resistance performance.

According to the present embodiment, the transverse groove 120 and the intersectional transverse groove 146 formed in the center rib A3 are configured to end in the land unit. Because of this, it is possible to retain the rigidity of the center rib A3 having a higher ground pressure on the road surface compared to the other ribs. As a result, it is possible to improve the braking performance and the wear resistance performance.

According to the present embodiment, the transverse groove 20 formed in the second rib A2 and the second rib A4 and the transverse groove 32 in the intersectional narrow groove 30 differ in the inclining direction with respect to the straight line along the tread width direction W, outwardly in the tread width direction W from the circumferential narrow groove 10. This enables inhibition of a so-called pattern flow, which is a phenomenon that in the second small rib A21, ribs located outwardly in the tread width direction W from the circumferential narrow groove 10 sweep in the same direction when the vehicle is driving. As a result, in particular, it is possible to increase the steering stability performance when the vehicle is driving on a dry road surface.

(8) Other Embodiments

So far, the present invention is disclosed through the embodiment thereof. However, it should not be interpreted that the statements and drawings constituting a part of the present disclosure limit the present invention. From the present disclosure, various alternative embodiments, examples, and operational technologies will become apparent to those skilled in the art.

For example, the embodiment of the present invention can be modified as follows.

In the above-mentioned embodiment, the intersectional narrow groove 30 of the heavy duty tire 1 includes the transverse groove 32 extending in linear fashion along the tread width direction W and the longitudinal groove 34 extending in linear fashion along the tire circumferential direction R, and is formed in L shape. In addition thereto, the intersectional narrow groove may extend along the tire circumferential direction R or the tread width direction W in the form of a curve, in zigzag fashion, or in a shape obtained by combining these, in view of a tread surface.

In the above-mentioned embodiment, the intersectional narrow groove 30 formed in the second rib A4 and the intersectional narrow groove 30 formed in the second rib A2 are shaped symmetrically with respect to an arbitrary point or center on the tire equator line CL. In addition thereto, the intersectional narrow grooves of different shapes may be formed in the second rib A4 and the second rib A2. Similarly, the transverse groove 20, the transverse groove 130, and the transverse groove 120 may be formed in different shapes with respect to the tire equator line CL.

In above-mentioned embodiment, the sipe 20S is arranged in the transverse groove 20 formed in the second rib A2 and the second rib A4 and the sipe 120S is arranged in the transverse groove 120 formed in the center rib A3. The sipe 20S is formed in such a way that the depth of the tire radial direction is larger, in the opening portion where the circumferential grooves 112 and 114 and the transverse groove 20 communicate and in the center portion of the tread width direction W of the second rib A2 and the second rib A4. In addition thereto, the depths of the tire radial direction of the sipe 120S and the sipe 20S arranged in the transverse groove 20 and the transverse groove 120 may be made uniform across the entire tread width direction W. Further, the sipe 20S and the sipe 120S may not necessarily be arranged in the transverse groove 20 or the transverse groove 120.

In the above-mentioned embodiment, the transverse groove 130 is formed in the shoulder rib A1 and the shoulder rib A5. However, instead of the transverse groove 130, a transverse groove of a different shape may be formed. Further, a sipe may be formed. Preferably, either one of the transverse groove or the sipe may be formed. The depths of the tire radial direction of the transverse groove and the sipe formed in the shoulder rib A1 and the shoulder rib A5 are smaller than those of the circumferential grooves 110, 112, 114, and 116. As a result, as long as lowering of rigidity of the shoulder rib A1 and the shoulder rib A5 and uneven wear can be inhibited, then that shape can be appropriately set.

As mentioned above, it is of course that the present invention includes various embodiments and the like not described here. Therefore, the technical range of the present invention is to be defined only by the inventive specific matter according to the adequate claims from the above description.

The entire contents of Japanese Patent Application No. 2009-142472 (filed on Jun. 15, 2009) are incorporated in the present specification by reference.

INDUSTRIAL APPLICABILITY

According to the present invention, it is possible to provide a heavy duty tire in which wet performance at the time of turning is further improved while inhibiting uneven wear of the tread shoulder unit.

REFERENCE NUMERAL

A1, A5 . . . shoulder rib, A2, A4 . . . second rib, A3 . . . center rib, B1,B2 . . . uneven wear absorbing rib, CL, CL2 . . . tire equator line, P1, P2 . . . interval, R . . . tire circumferential direction, W . . . tread width direction, 1 . . . heavy duty tire, 10, 12 . . . circumferential narrow groove, 20, 20A . . . transverse groove, 20S, 120S . . . sipe, 30, 30A, 30B, 30C . . . intersectional narrow groove, 32, 32B, 32C, 32D . . . transverse groove, 34, 34B, 34C . . . longitudinal groove, 110, 112, 114, 116 . . . circumferential groove, 120, 130 . . . transverse groove, 142, 144 . . . intersectional transverse groove

The invention claimed is:

1. A heavy duty tire, comprising:
a shoulder rib that is arranged in a tread shoulder unit and extends in a tire circumferential direction;
a center side rib that is adjacent to the shoulder rib through a circumferential groove, is arranged nearer to a tire equator line than the shoulder rib, and extends in the tire circumferential direction; and
an uneven wear absorbing rib that is arranged in the circumferential groove, extends in the tire circumferential direction, and is positioned inwardly in a tire radial direction from a tread of the shoulder rib and the center side rib, wherein
in the center side rib, a circumferential narrow groove is formed that has a groove width smaller than the circumferential groove and extends continuously in the tire circumferential direction, and the circumferential narrow groove is formed outwardly from a center in the tread width direction of the center side rib, when the tire is mounted on a vehicle, wherein an intersectional narrow groove intersecting the circumferential narrow groove is formed in the center side rib, wherein the intersectional narrow groove comprises:

a transverse groove extending along the tread width direction; and a longitudinal groove extending along the tire circumferential direction, wherein the transverse groove is inclined at an angle larger than 0 degrees to smaller than 45 degrees with respect to a straight line along the tread width direction, wherein in the center side rib, a narrow groove is formed that extends in the tread width direction and has a groove width smaller than the circumferential groove, and the narrow groove and the transverse groove differ in an inclining direction with respect to the straight line along the tread width direction outwardly in the tread width direction from the circumferential narrow groove wherein the circumferential narrow groove, the intersectional narrow groove, and the narrow groove that extends in the tread width direction define an asymmetric pattern on the center side rib with respect to the center of the center side rib.

2. The heavy duty tire according to claim 1, wherein in planner view of a tread surface, compared to a center in the tread width direction of the center side rib, a total area of the circumferential narrow groove, the narrow groove, and the intersectional narrow groove provided on outward of the center side rib when a tire is mounted on a vehicle, is set to be 1.5 times or more a total area of the narrow groove and the intersectional narrow groove provided on inward of the center side rib when the tire is mounted on the vehicle.

3. The heavy duty tire according to claim 1, wherein the intersectional narrow groove is formed in L shape.

4. The heavy duty tire according to claim 1, wherein either end of the intersectional narrow groove communicates to the circumferential groove.

5. The heavy duty tire according to claim 1, wherein in the center side rib, a plurality of intersectional transverse grooves communicating to the circumferential groove are formed, and the plurality of intersectional transverse grooves are formed at predetermined interval in a tire circumferential direction.

6. The heavy duty tire according to claim 1, wherein depths of the circumferential narrow groove, the transverse groove and the intersectional narrow groove are less than a depth of the circumferential groove.

\* \* \* \* \*